United States Patent
Nachlieli et al.

(10) Patent No.: US 11,544,580 B2
(45) Date of Patent: Jan. 3, 2023

(54) METHODS AND SYSTEMS FOR IMPROVING ASSET OPERATION BASED ON IDENTIFICATION OF SIGNIFICANT CHANGES IN SENSOR COMBINATIONS IN RELATED EVENTS

(71) Applicant: PRECOGNIZE LTD., Tirat Hacarmel (IL)

(72) Inventors: Hila Nachlieli, Haifa (IL); Raanan Manor, Haifa (IL); Chen Linchevski, Bnei Zion (IL); Gabriel Shaar, Haifa (IL)

(73) Assignee: Precognize Ltd., Tirat Carmel (IL)

( * ) Notice: Subject to any disclaimer, the term of this patent is extended or adjusted under 35 U.S.C. 154(b) by 751 days.

(21) Appl. No.: 16/533,873

(22) Filed: Aug. 7, 2019

(65) Prior Publication Data
US 2021/0042632 A1 Feb. 11, 2021

(51) Int. Cl.
*G06F 16/28* (2019.01)
*G05B 23/02* (2006.01)
*G06N 5/02* (2006.01)

(52) U.S. Cl.
CPC ......... *G06N 5/022* (2013.01); *G05B 23/0283* (2013.01); *G06F 16/288* (2019.01)

(58) Field of Classification Search
CPC ........ G06F 16/288; G06N 20/00; G06N 3/08; G06N 5/022; G06N 7/06; G05B 23/0283
See application file for complete search history.

(56) References Cited

U.S. PATENT DOCUMENTS

| | | |
|---|---|---|
| 2002/0129038 A1 | 9/2002 | Cunningham |
| 2016/0343093 A1* | 11/2016 | Riland .................. G06Q 10/04 |
| 2016/0344598 A1 | 11/2016 | Indovina et al. |
| 2018/0239666 A1* | 8/2018 | Manor ............... G06F 11/0709 |
| 2018/0332434 A1* | 11/2018 | Kulkarni ................. H04L 43/10 |
| 2020/0103886 A1* | 4/2020 | Gandenberger ... G05B 23/0283 |
| 2020/0117532 A1* | 4/2020 | Wolfson ............. G06F 11/0709 |

OTHER PUBLICATIONS

"International Search Report and Written Opinion of the International Searching Authority", PCT/IL20/50786, dated Jan. 13, 2021, Alexandria, Virginia, US.

* cited by examiner

*Primary Examiner* — Yuk Ting Choi
(74) *Attorney, Agent, or Firm* — Reuven K. Mouallem, LL.M.; FlashPoint IP Ltd.

(57) ABSTRACT

The present invention discloses methods and systems for improving asset operation based on identification of significant changes in sensor combinations in related events. Methods include the steps of: providing an asset representation of an asset having an alert-aggregation system; creating a calculated indicator listing having at least one calculated indicator in the asset configured to calculate, predict, or estimate an indicated asset behavior; incorporating the calculated indicator listing into a set of entity connections by associating listing elements in the calculated indicator listing, thereby producing the interconnected representation; associating the identified asset behavior with at least one relevant object and/or at least one relevant process that is impairing the asset from optimally performing, conducting, and/or achieving the identified asset behavior; and generating at least one hint associated with at least one relevant object and/or at least one relevant process that is impairing the identified asset behavior.

30 Claims, 2 Drawing Sheets

Exemplary Embodiment

METHODS AND SYSTEMS FOR IMPROVING ASSET OPERATION BASED ON IDENTIFICATION OF SIGNIFICANT CHANGES IN SENSOR COMBINATIONS IN RELATED EVENTS

FIELD AND BACKGROUND OF THE INVENTION

The present invention relates to methods and systems for improving asset operation based on identification of significant changes in sensor combinations in related events in which the asset failed to meet desired behavior.

Predictive maintenance and failure detection and analysis are critical in many industries in which unpredicted problems may be costly, involving a host of adverse results including monetary loss, operational downtime, equipment loss, property damage, penalties, compensation, and sometimes even human fatality. To prevent such damages, many industrial plants install sensors to help monitor factory production and its processes, generating alerts to notify operators of potential problems. Due to the nature of complex systems, which include a large number of possible normal system states, and the fact that each alert can contain a large number of sensors, the use of machine-learning algorithms typically can generate valuable information as well as misleading false alarms, complicating the analysis and focus of the important asset elements relating to asset operation and performance.

U.S. Pat. No. 10,318,364 B2, having common inventorship and assigned to the same entity as the present invention, teaches methods for problem-alert aggregation. Even in system environments in which such problem-alert aggregation is implemented, determining which so-called "events" are of high concern, and what are the underlying causes, factors, and their interrelations of such events is a challenging task.

It would be desirable to have methods and systems for improving asset operation based on identification of significant changes in sensor combinations in related events. Such methods and systems would, inter alia, overcome the various limitations mentioned above.

SUMMARY

It is the purpose of the present invention to provide methods and systems for improving asset operation based on identification of significant changes in sensor combinations in related events.

It is noted that the term "exemplary" is used herein to refer to examples of embodiments and/or implementations, and is not meant to necessarily convey a more-desirable use-case. Similarly, the terms "alternative" and "alternatively" are used herein to refer to an example out of an assortment of contemplated embodiments and/or implementations, and is not meant to necessarily convey a more-desirable use-case. Therefore, it is understood from the above that "exemplary" and "alternative" may be applied herein to multiple embodiments and/or implementations. Various combinations of such alternative and/or exemplary embodiments are also contemplated herein.

For purposes of clarity, several terms which follow are specifically defined for use herein. The term "asset" is used herein to refer to a complex physical system having a purpose or main activity, and composed of a large number of interlaced entities, objects, parts, and processes, acting together to achieve the propose or main activity. Examples of such assets include industrial complexes, production facilities, chemical refineries, complex physical operations, complex machinery, automated machinery, self-driving vehicles, locomotives, boats, airplanes, complex computer programs, and biological systems.

The term "object" is used herein to refer to any physical item (i.e., something you can touch or access). The term "process" is used herein to refer to is a non-physical item that influences at least one object. The term "entity" is used herein to refer to the broader category of objects and/or processes. The terms "feature" or "attribute" are used herein to refer to a property of an entity. The term "sensor" is used herein to refer to a sensor, measurement, user labels, or a column in a database.

The term "asset representation" is used herein to refer to a model of an asset including not only the physical parts of the asset, but also characteristics of the asset such as asset processes, features, and sensors. Asset representation of a specific asset, whether a factory/plant structure, machine, chemical refinery, biological system, and/or production process, includes all or some of the sensors that produced the data-driven alerts.

The term "identified asset behavior" or "identified behavior" is used herein to refer to specific behavior of the asset that can either be favorable (i.e., something to be encouraged) or unfavorable (i.e., something to be discouraged). Such identified behavior can be used to set a goal or target. As an example, one type of identified behavior could be a certain production level. Another type of identified behavior could be to reduce the incidence of an event of a specifically pre-defined type such as an identified event (extended from its attributed meaning in U.S. Pat. No. 10,318,364 B2).

The term "calculated indicator" is used herein to refer to a measure that is calculated, predicted, or estimated from data of sensors in the asset.

The term "templet" is used herein to refer to a skeleton of an asset representation for a sub-asset in the asset. Such sub-asset may appear more than once, in either same or different variations, in the asset. A templet may include additional information about the modeled sub-asset, such as failure analysis guidance, preferences, priorities, rules or recommendations.

The term "hint" is used herein to refer to the highlighting of abnormal sensor-measurement combinations in the asset. Such hints assist in clarifying the underlying abnormality in the asset and possibly also its causes.

The term "graph" is used herein to refer to a set of vertices connected by edges. The terms "data-driven alerts" or simply "alerts" are used herein to refer to alarms produced from real-world data, measured and/or detected on the asset and its entities. The alerts are produced by a data-mining, machine-learning, or deep-learning algorithm (e.g., sensor thresholds, problem-specific alert scripts, pattern detection of known problems, pattern likelihood of known problems, classification of known problems, abnormal-state detection, measurement deviation from an algorithm's predictions, trend detection, and/or new-cluster detection).

Therefore, according to the present invention, there is provided for the first time a method for identifying and improving asset behavior based on an interconnected representation of a complex physical operation, the method including the steps of: (a) providing an asset representation of an asset, wherein the asset is a complex physical system having a main activity; wherein an object is a physical item; wherein a process is a non-physical item that influences at least one object; wherein entities are physical objects and/or processes of the asset; and wherein the entities are adapted to act together to achieve the main activity; and wherein the asset representation includes: (i) a sensor listing having all relevant sensors, all relevant measurements, and/or all relevant sensor-data columns in a database, related to real-world data measured and/or detected in the asset; (ii) an object listing having at least two relevant objects in the asset; (iii) a process listing having at least two relevant processes in the asset; (iv) a set of entity connections by associating listing elements in the sensor listing, the object listing, and the process listing; wherein all relevant objects and all relevant processes in the asset are properly listed and correspondingly associated into the asset representation of the asset; (b) creating a calculated indicator listing having at least one calculated indicator in the asset, wherein each calculated indicator is a measure configured to calculate, predict, or estimate an indicated asset behavior based on assessing the sensor listing in the asset, and wherein each calculated indicator is directly influenced by at least two relevant processes; (c) incorporating the calculated indicator listing into the set of entity connections by associating listing elements in the calculated indicator listing, wherein all relevant objects and all relevant processes in the asset are properly listed and correspondingly associated into the asset representation of the asset, thereby producing the interconnected representation; (d) associating the identified asset behavior with at least one relevant object and/or at least one relevant process that is impairing the asset from optimally performing, conducting, and/or achieving the identified asset behavior; and (e) generating at least one hint associated with at least one relevant object and/or at least one relevant process that is impairing the identified asset behavior.

Alternatively, at least one calculated indicator is defined as a function of a sub-set of the sensor listing elements.

Alternatively, the method further includes the steps of: (f) calculating a score for each combination of the sensor listing elements using a predefined function, wherein the combination relates to the identified asset behavior; and (g) prioritizing at least one hint based on the score.

Alternatively, the step of creating includes using at least one period of identified asset behavior occurrence or non-occurrence to create at least one calculated indicator.

Alternatively, the method further includes the steps of: (f) comparing a first given asset representation having the identified asset behavior to a second given asset representation lacking the identified asset behavior to produce a comparison representation; and (g) relating at least one hint to at least one listing element appearing in the comparison representation.

Alternatively, the method further includes the step of: (f) training a machine-learning algorithm to predict states of the identified asset behavior of the asset representation, wherein the step of training further identifies related listing elements.

Alternatively, the step of incorporating includes using the asset representation to extend the assessing of the sensor listing as input to at least one calculated indicator.

Alternatively, the method further includes the steps of: (f) verifying the set of entity connections of the asset representation by analyzing the real-world data obtained by the relevant sensors; and (g) cleaning the set of entity connections of the asset representation by retaining directly-influencing connections in the set, and by removing distal and/or indirectly-influencing connections from the set.

Alternatively, the method further includes the steps of: (f) gathering user feedback on at least one hint; (g) learning a hint-scoring function from the user feedback; (h) calculating a score for each combination of the sensor listing elements using the hint-scoring function, wherein the combination relates to the identified asset behavior; and (i) prioritizing at least one hint based on the score.

Alternatively, the method further includes the step of: (f) modifying at least one hint based on at least templet of the asset representation.

According to the present invention, there is provided for the first time a system for identifying and improving asset behavior based on an interconnected representation of a complex physical operation, the system including: (a) a CPU for performing computational operations; (b) a memory module for storing data; (c) an alert-aggregation module configured for: (i) providing an asset representation of an asset, wherein the asset is a complex physical system having a main activity; wherein an object is a physical item; wherein a process is a non-physical item that influences at least one object; wherein entities are physical objects and/or processes of the asset; and wherein the entities are adapted to act together to achieve the main activity; and wherein the asset representation includes: (A) a sensor listing having all relevant sensors, all relevant measurements, and/or all relevant sensor-data columns in a database, related to real-world data measured and/or detected in the asset; (B) an object listing having at least two relevant objects in the asset; (C) a process listing having at least two relevant processes in the asset; (D) a set of entity connections by associating listing elements in the sensor listing, the object listing, and the process listing; wherein all relevant objects and all relevant processes in the asset are properly listed and correspondingly associated into the asset representation of the asset; (d) a calculated-indicator module configured for creating a calculated indicator listing having at least one calculated indicator in the asset, wherein each calculated indicator is a measure configured to calculate, predict, or estimate an indicated asset behavior based on assessing the sensor listing in the asset, and wherein each calculated indicator is directly influenced by at least two relevant processes; (e) an indicator-connection module configured for incorporating the calculated indicator listing into the set of entity connections by associating listing elements in the calculated indicator listing, wherein all relevant objects and all relevant processes in the asset are properly listed and correspondingly associated into the asset representation of the asset, thereby producing the interconnected representation; (f) an identified-behavior module configured for associating the identified asset behavior with at least one relevant object and/or at least one relevant process that is impairing the asset from optimally performing, conducting, and/or achieving the identified asset behavior; and (g) a hint-generation module configured for generating at least one hint associated with at least one relevant object and/or at least one relevant process that is impairing the identified asset behavior.

Alternatively, at least one calculated indicator is defined as a function of a sub-set of the sensor listing elements.

Alternatively, the system further includes: (h) a score-calculation module configured for calculating a score for each combination of the sensor listing elements using a predefined function, wherein the combination relates to the identified asset behavior; and (i) a hint-prioritization module configured for prioritizing at least one hint based on the score.

Alternatively, the calculated-indicator module is further configured for using at least one period of identified asset behavior occurrence or non-occurrence to create at least one calculated indicator.

Alternatively, the system further includes: (h) a representation-comparison module configured for comparing a first given asset representation having the identified asset behavior to a second given asset representation lacking the identified asset behavior to produce a comparison representation; and (i) a hint-relating module configured for relating at least one hint to at least one listing element appearing in the comparison representation.

Alternatively, the system further includes: (h) a training module configured for training a machine-learning algorithm to predict states of the identified asset behavior of the asset representation, wherein the training further identifies related listing elements.

Alternatively, the indicator-connection module is further configured for using the asset representation to extend the assessing of the sensor listing as input to at least one calculated indicator.

Alternatively, the system further includes: (h) a data-verifying module configured for verifying the set of entity connections of the asset representation by analyzing the real-world data obtained by the relevant sensors; and (i) a connection-cleaning module configured for cleaning the set of entity connections of the asset representation by retaining directly-influencing connections in the set, and by removing distal and/or indirectly-influencing connections from the set.

Alternatively, the hint-generation module is further configured for: (i) gathering user feedback on at least one hint; (ii) learning a hint-scoring function from the user feedback; (iii) calculating a score for each combination of the sensor listing elements using the hint-scoring function, wherein the combination relates to the identified asset behavior; and (iv) prioritizing at least one hint based on the score.

Alternatively, the hint-generation module is further configured for modifying at least one hint based on at least templet of the asset representation.

According to the present invention, there is provided for the first time a non-transitory computer-readable storage medium, having computer-readable code embodied on the non-transitory computer-readable storage medium, for identifying and improving asset behavior based on an interconnected representation of a complex physical operation, the computer-readable code including: (a) program code for providing an asset representation of an asset, wherein the asset is a complex physical system having a main activity; wherein an object is a physical item; wherein a process is a non-physical item that influences at least one object; wherein entities are physical objects and/or processes of the asset; and wherein the entities are adapted to act together to achieve the main activity; and wherein the asset representation includes: (i) a sensor listing having all relevant sensors, all relevant measurements, and/or all relevant sensor-data columns in a database, related to real-world data measured and/or detected in the asset; (ii) an object listing having at least two relevant objects in the asset; (iii) a process listing having at least two relevant processes in the asset; (iv) a set of entity connections by associating listing elements in the sensor listing, the object listing, and the process listing; wherein all relevant objects and all relevant processes in the asset are properly listed and correspondingly associated into the asset representation of the asset; (b) program code for creating a calculated indicator listing having at least one calculated indicator in the asset, wherein each calculated indicator is a measure configured to calculate, predict, or estimate an indicated asset behavior based on assessing the sensor listing in the asset, and wherein each calculated indicator is directly influenced by at least two relevant processes; (c) program code for incorporating the calculated indicator listing into the set of entity connections by associating listing elements in the calculated indicator listing, wherein all relevant objects and all relevant processes in the asset are properly listed and correspondingly associated into the asset representation of the asset, thereby producing the interconnected representation; (d) program code for associating the identified asset behavior with at least one relevant object and/or at least one relevant process that is impairing the asset from optimally performing, conducting, and/or achieving the identified asset behavior; and (e) program code for generating at least one hint associated with at least one relevant object and/or at least one relevant process that is impairing the identified asset behavior.

Alternatively, at least one calculated indicator is defined as a function of a sub-set of the sensor listing elements.

Alternatively, the computer-readable code further includes: (f) program code for calculating a score for each combination of the sensor listing elements using a pre-defined function, wherein the combination relates to the identified asset behavior; and (g) program code for prioritizing at least one hint based on the score.

Alternatively, the creating includes using at least one period of identified asset behavior occurrence or non-occurrence to create at least one calculated indicator.

Alternatively, the computer-readable code further includes: (f) program code for comparing a first given asset representation having the identified asset behavior to a second given asset representation lacking the identified asset behavior to produce a comparison representation; and (g) program code for relating at least one hint to at least one listing element appearing in the comparison representation.

Alternatively, the computer-readable code further includes: (f) program code for training a machine-learning algorithm to predict states of the identified asset behavior of the asset representation, wherein the training further identifies related listing elements.

Alternatively, the incorporating includes using the asset representation to extend the assessing of the sensor listing as input to at least one calculated indicator.

Alternatively, the computer-readable code further includes: (f) program code for verifying the set of entity connections of the asset representation by analyzing the real-world data obtained by the relevant sensors; and (g) program code for cleaning the set of entity connections of the asset representation by retaining directly-influencing connections in the set, and by removing distal and/or indirectly-influencing connections from the set.

Alternatively, the computer-readable code further includes: (f) gathering user feedback on at least one hint; (g) learning a hint-scoring function from the user feedback; (h) calculating a score for each combination of the sensor listing elements using the hint-scoring function, wherein the combination relates to the identified asset behavior; and (i) prioritizing at least one hint based on the score.

Alternatively, the computer-readable code further includes: (f) program code for modifying at least one hint based on at least templet of the asset representation.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE ILLUSTRATIVE EMBODIMENTS

Figure 1:
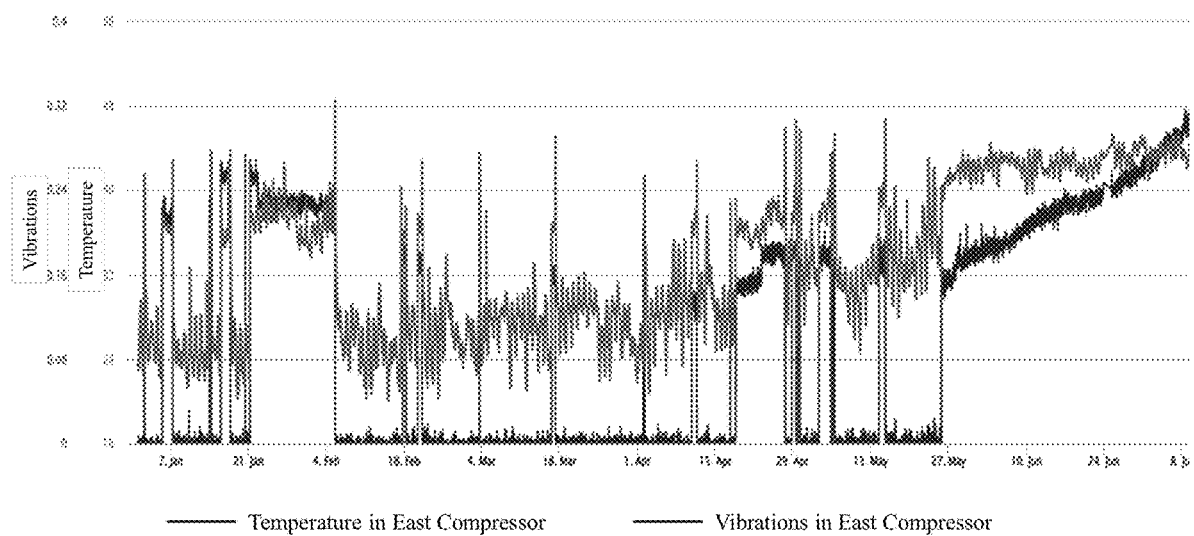
FIG. 1 is a depiction of an exemplary hint for a notional event in an asset involving temperature and vibration sensors, according to embodiments of the present invention.

The present invention relates to methods and systems for improving asset operation based on identification of significant changes in sensor combinations in related events. The principles and operation for providing such methods and systems, according to the present invention, may be better understood with reference to the accompanying description and the drawings.

An Asset Data Graph (ADG) described herein accurately depicts an asset representation if the results of a predefined set of queries are identical on both the graph and the asset representation. Similarly, an asset representation depicts the asset if the results of the predefined set of queries for the asset representation and a human expert are identical. Therefore, having a graph for an ADG enables the replacement of queries to a human expert by employing standard query libraries on the ADGs derived from the asset representation.

Such a system has no knowledge of, or access to, the asset. Hence, the system cannot verify that the asset representation is a faithful representation of the asset. The system is responsible for the resulting representation being valid in order to be used for alert aggregation. The system replaces the modeling-language expert who communicates with the "asset expert" in traditional modeling systems, providing the asset expert with a simple and well-defined procedure to model his asset on his/her own.

An asset-structure panel of the system contains the asset's hierarchical object structure, with objects potentially being items containing other entities. An asset-behavior panel of the system contains hierarchical processes in the asset, with the root process embodying the main function of the asset. Processes may be connected to objects in such an asset-structure panel, which may influence a process, be influenced by a process, or both. Note that a process may be directional, which indicates the direction of influence.

The output of such a system is a sensor-incorporated, asset representation, which is converted into ADGs for automatically querying using standard query libraries on the AGDs. The replies of a predefined set of queries are required to match the replies of an asset expert, and are described in terms which are fully understood by the asset expert.

All elements of an ADG, whether sensor elements, entity elements (i.e., object elements and/or process elements), or attribute elements, may include additional metadata and information such as detailed explanations or references to a user-guide or problem resolution manual. Data measurements and sensors are connected to the attributes measured, and in turn such attributes are connected to the relevant entities in the ADG, which makes the data a native part of the ADG.

In one embodiment of the present invention, the asset representation undergoes verification and cleaning procedures in which the asset representation links are verified via analysis of the relevant sensor data. Links that imply direct cause or influence are retained, and links that imply a distal or indirect influence are removed. The weight of the retained links and elements of the asset representation may be changed in the cleaning process.

Alerts are aggregated into events, which are identified and scored (e.g., reflecting event importance, relevance, or significance) according to the asset representation or the ADG. Such aggregation typically yields a few focused events. Each alert originates from at least one sensor, which is connected to an attribute that describes an entity in the ADG. All alerts triggered by neighboring, dependent, similar or process-connected entities of the asset representation are accumulated into a single event. A resulting event is expressed in the terms used to describe the relevant elements of the asset in the asset representation, which are the terms and expressions used and understood by the maintenance and security team.

In some exemplary use-cases, events may be presented with hints that highlight abnormal combinations of sensor-measurement in an event. Such hints assist in clarifying the underlying issue and its causes. Referring to the drawings, FIG. 1 is a depiction of an exemplary hint for a notional event in an asset involving temperature and vibration sensors, according to embodiments of the present invention. Suppose an event evolves around an East Compressor in an asset as demarked in FIG. 1. As aggregation of many evolving alerts occurs, the event may involve several sensors and elements, and a technically-knowledgeable person should check the East Compressor for repair.

To help in this task, the system highlights the most abnormal sensor-measurement combinations in the event, which are referred to as hints. FIG. 1 depicts such a hint, highlighting the changes of the East Compressor operation to the technical personal around the "May 27" data entry in the relative temperature-vibration behavior.

In one embodiment of the present invention, potential hints are created by listing all combinations of elements in the event and their asset-representation-related elements. In yet another embodiment of the present invention, potential hints are created by applying templet guidance, rules, priorities and/or recommendations on elements in the events that are also included in a pre-defined templet. For each potential hint, many attributes (including, but not only, statistical attributes of related measurements) are produced. Such potential hints are scored, with the highest scores being presented as hints of the related event.

In one use-case, the scores of the potential hints are determine by a pre-defined function of their attributes. In yet another use-case, feedback about the usefulness of each hint may be provided, and a machine-learning functionality may be activated to learn the functions of the attributes that score the potential hints so that high-scoring hints are more likely to be helpful.

In yet another embodiment, the scores of potential hints that include elements that are also part of a templet are influenced by templet definitions, rules, and/or recommendations. In yet another embodiment, the scores are influenced by user response to previously-presented hints in this or different events. In yet another use-case, hints are presented in an order configured to improve the overall event analysis, while in another use-case the hints are presented in an order designed to accelerate the resolution of the specific event.

The system enables the definition of a calculated indicator that is configured to calculate, predict, or estimate an indicated asset behavior based on sensors or measures in/of the asset.

In one use-case, the input may include a method or function for deriving a calculated indicator designating an identified asset behavior based on measurements of asset sensors. One example for such a designation of an identified event would be for a boiler alert to be designated as "occurs" when the temperature measured by a sensor TMP503 is above 400° C., or when the pressure measured by a sensor PRS503 is above 10 atmospheres.

In yet another use-case, the system may automatically create a calculated indicator, for example, by designating an identified asset behavior to a specific event. The system may automatically connect the identified behavior element to entities significant in the related event in the asset representation.

In yet another use-case, the related calculated indicator may also include recommendations for action in case of such an identified behavior (e.g., in case of a boiler alert, reduce the pressure down to 8 atmospheres). In yet another calculated indicator, the identified event is positive (e.g., the asset is in an optimal production state).

In another such use-case, the input defining an identified asset behavior may include examples of historical periods in which the identified behavior occurred and did not occur. User labels may be accumulated by interactive interaction. An automatically-created calculated indicator learns to predict the occurrence of the identified behavior based on the accumulated historical periods using machine-learning methods.

Figure 2:
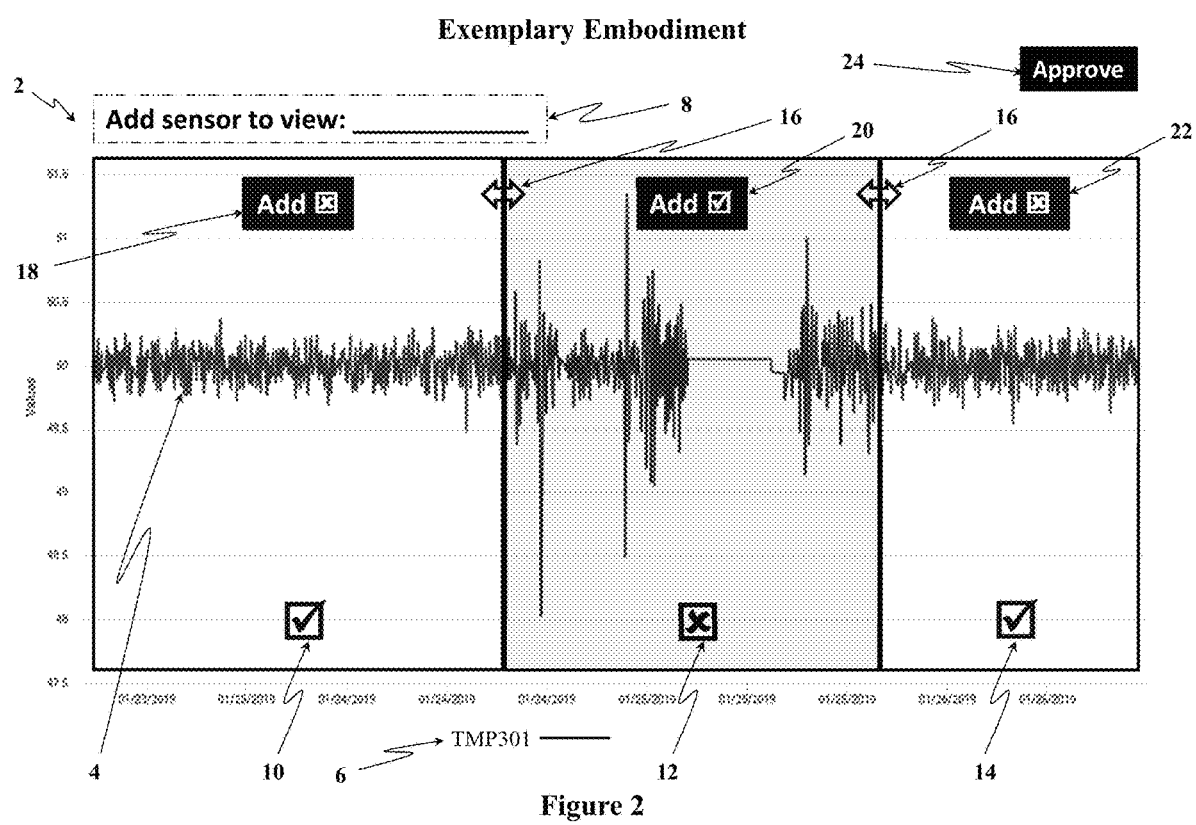
FIG. 2 is a depiction of an exemplary simplified graphical user interface (GUI) for the collection of user labels for the occurrence of specific periods of identified asset behavior, according to embodiments of the present invention.

FIG. 2 is a depiction of an exemplary simplified graphical user interface (GUI) for the collection of user labels for the occurrence of specific periods of identified asset behavior, according to embodiments of the present invention. The system presents the asset expert with selected periods and the related event-labels produced by the system for those periods, and allows the asset expert to correct, refine, change or approve the presented labels of the identified-behavior. A GUI 2 depicts a graph of a trace plot 4 shows the readings of a sensor that the user examines in order to label identified behavior.

The sensor is identified as sensor TMP301 (for example) by index 6 at the bottom of GUI 2. The user can load additional sensors to examine by writing their names in the text box in a sensor panel entry 8. Panels 10, 12, and 14 indicate the related labels currently produced by the system for each sub-period, with panels 10 and 14 indicating that the system predicts that sub-periods demonstrate the identified behavior (depicted by a "✓" in the indication box). Panel 12 indicates that the system predicts that the identified behavior is not demonstrated in this sub-period (depicted by an "x" in the indication box). The user can change labels in each sub-panel to toggle between identified and unidentified behavior.

Arrows 16 enable the user to change the location of the boundaries of each panel, and Panel buttons 18, 20, and 22 enable the user to add panels with "opposing" labels in the middle of existing sub-panels (e.g., a sub-panel marked as "✓" can have an "x"-labeled region inside it or vice versa). The interaction (i.e., user experience) with GUI 2 ends when the user presses an "approve" button 24, designating the labels in GUI 2 as the correct user labels. The system receives the user labels, and produces an improved predictor for the identified behavior. The system then presents another period to the user for labeling. The user can ignore the labeling requests. However, the more precisely labeled periods the user supplies, the better the definition of the identified behavior.

In one use-case, the order of the periods presented for label refinement, correction, or approval is determined at random. In another use-case, the order of the presented periods is configured to show similar patterns (e.g., to encourage user interaction). In yet another use-case, the order of the presented periods is determined based on the uncertainty in identifying event in those periods. In yet another use-case, the presented period is selected after checking the differences in the predictions of the calculated indicator when the identified behavior labels in the period are assumed to demonstrate the identified event ("✓" in the indication box) or when the identified event labels are assumed to not demonstrate the identified event ("x" in the indication box). Thus, the presented period represents the difference in labeling that most influences the calculated indicator outcome. In yet another use-case, the order of the presented periods is determined based on their likelihood to lead to the biggest reduction in overall uncertainty in identifying an event.

The system may ask the user to add and connect an element representing the identified behavior to the asset representation, specifically processes that directly influence the identified behavior. In yet another use case, the system may automatically connect the identified behavior element to entities containing the sensors considered or observed by the user when defining the calculated indicator. For example, in GUI 2 of FIG. 2, the asset expert can add sensors to the view, via sensor panel entry 8, for better understanding of the system in a given period, resulting in better user-label assignment of the identified behavior.

For all types of calculated sensors (e.g., function-defined, period-defined, or system-defined calculated indicators), the system may collect all indicated sensors, connect the sensors (and the entities connected to the sensors) to the elements of the identified behavior in the asset representation, and/or increase the weights of those links. After the element of the identified behavior is connected to entities that are already embedded in the asset representation, the system may consider some of the entities connected to those entities (e.g., up to a certain distance) as influencing the calculated indicator, and consider measurement of sensors in those entities as input of the calculated indicator.

The system may activate the verification and cleaning procedure described above via analyzing related sensor data in order to remove connections from non-influencing elements to the identified-behavior element, and to select a subset of the related sensors that influence the identified behavior. Finally, the system can add all those elements or only the influencing elements to the input of the related calculated indicator that learns to identify this identified behavior (e.g., by using machine learning algorithms).

The calculated indicators are used to investigate and improve the operational aspect expressed by the identified behavior. The system provides hints in the form of potential ways to improve the operational aspect via the following capabilities.

A. By comparing the influencing elements produced for the calculated indicator in identified behavior occurrences versus elements produced for non-occurrences. In both cases, the relevant influencing elements are derived from the asset representation, the sensor measurements, and the cleaning process, which is performed separately for each of those behaviors.

B. By running the system in transition periods in which the system shifts from desired to undesired behavior or vice versa, a related alert aggregation system (e.g., as described in U.S. Pat. No. 10,318,364 B2) can produce related events, their main elements, and possibly related hints as detailed above, which enable investigation, understanding, and focus on how to improve the desired operational aspect, and identification of the influencing elements.

C. Training a machine-learning algorithm to predict states in which the identified behavior occurs and doesn't occur. The elements that are significant in the trained machine-learning model are the differentiators between those two states, and are the main influencing elements on the identified behavior.

Once the main elements influencing the identified behavior are identified, related hints are produced as described above, and presented to the user.

While the present invention has been described with respect to a limited number of embodiments, it will be appreciated that many variations, modifications, and other applications of the present invention may be made.

What is claimed is:

1. A method for identifying and improving asset behavior based on an interconnected representation of a complex physical operation, the method comprising the steps of:
    (a) providing an asset representation of an asset, wherein said asset is a complex physical system having a main activity; wherein an object is a physical item; wherein a process is a non-physical item that influences at least one object; wherein an entity is at least one physical object alone, at least one process alone, or at least one physical object and at least one process taken together of said asset; and wherein at least two said entities are adapted to act together to achieve said main activity; and wherein said asset representation includes:
        (i) a sensor listing having all relevant sensors available, all relevant measurements available, and/or all relevant sensor-data columns available in a database, related to real-world data measured or detected in said asset;
        (ii) an object listing having at least two relevant objects in said asset;
        (iii) a process listing having at least two relevant processes in said asset;
        (iv) a set of entity connections by associating listing elements in said sensor listing, said object listing, and said process listing; wherein all relevant objects and all relevant processes in said asset are properly listed and correspondingly associated into said asset representation of said asset;
    (b) creating a calculated-indicator listing having at least one calculated-indicator in said asset, wherein each said calculated-indicator is a measure configured to calculate, predict, or estimate an identified asset behavior based on assessing said sensor listing in said asset, wherein said identified asset behavior is defined as a specific target behavior of said asset, and wherein said each calculated-indicator is directly influenced by said at least two relevant processes;
    (c) incorporating said calculated-indicator listing into said set of entity connections by associating elements of said calculated-indicator listing with entities of said set of entity connections, wherein all relevant objects and all relevant processes in said asset are properly listed and correspondingly associated into said asset representation of said asset, thereby producing the interconnected representation;
    (d) associating said identified asset behavior with at least one said relevant object alone, at least one said relevant process alone, or said at least one relevant object and said at least one relevant process taken together that is impairing said asset from optimally performing, conducting, or achieving said identified asset behavior; and
    (e) generating at least one hint associated with said at least one relevant object alone, said at least one relevant process alone, or said at least one relevant object and said at least one relevant process taken together that is impairing said identified asset behavior, wherein said at least one hint specifies at least one said relevant object, at least one said relevant process, or at least one sensor-measurement combination in said asset representation of said asset.

2. The method of claim 1, wherein said at least one calculated-indicator is defined as a function of a sub-set of said sensor listing elements.

3. The method of claim 1, the method further comprising the steps of:
    (f) calculating a score for each said at least one hint using a predefined function, wherein said combination relates to said identified asset behavior; and
    (g) prioritizing said at least one hint based on said score.

4. The method of claim 1, wherein said step of creating includes using at least one period of identified asset behavior occurrence or non-occurrence to create said at least one calculated-indicator.

5. The method of claim 1, the method further comprising the steps of:
    (f) prior to said step of said identified asset behavior, comparing a first given interconnected representation having said identified interconnected behavior to a second given asset representation lacking said identified asset behavior to produce a comparison representation; and
    (g) relating said at least one hint to at least one listing element appearing in said comparison representation.

6. The method of claim 1, the method further comprising the step of:
    (f) training a machine-learning algorithm to predict status of said identified asset behavior, wherein said step of training further identifies related said listing elements.

7. The method of claim 1, wherein said step of incorporating includes using said asset representation to extend said assessing of said sensor listing as input to said at least one calculated-indicator.

8. The method of claim 1, the method further comprising the steps of:
    (f) prior to said step of said identified asset behavior, verifying said set of entity connections of said asset representation by analyzing said real-world data obtained by said relevant sensors; and
    (g) subsequent to said step of verifying, cleaning said set of entity connections of said asset representation by retaining directly-influencing connections in said set, and by removing distal and/or indirectly-influencing connections from said set.

9. The method of claim 1, the method further comprising the steps of:
    (f) gathering user feedback on said at least one hint;
    (g) learning a hint-scoring function from said user feedback;
    (h) calculating a score for each said at least one hint using said hint-scoring function; and
    (i) prioritizing said at least one hint based on said score.

10. The method of claim 1, the method further comprising the step of:
    (f) modifying said at least one hint based on at least one templet of said asset representation.

11. A system for identifying and improving asset behavior based on an interconnected representation of a complex physical operation, the system comprising:
    (a) a CPU for performing computational operations;
    (b) a memory for storing data and having computer-readable code embodied therein, wherein said computer-readable code includes:

(i) program code for providing an asset representation of an asset, wherein said asset is a complex physical system having a main activity; wherein an object is a physical item; wherein a process is a non-physical item that influences at least one object; wherein an entity is at least one physical object alone, at least one process alone, or at least one physical object and at least one process taken together of said asset; and wherein at least two said entities are adapted to act together to achieve said main activity; and wherein said asset representation includes:
  (A) a sensor listing having all relevant sensors available, all relevant measurements available, and all relevant sensor-data columns available in a database, related to real-world data measured or detected in said asset;
  (B) an object listing having at least two relevant objects in said asset;
  (C) a process listing having at least two relevant processes in said asset;
  (D) a set of entity connections by associating listing elements in said sensor listing, said object listing, and said process listing; wherein all relevant objects and all relevant processes in said asset are properly listed and correspondingly associated into said asset representation of said asset;
(ii) program code for creating a calculated-indicator listing having at least one calculated-indicator in said asset, wherein each said calculated-indicator is a measure configured to calculate, predict, or estimate an identified asset behavior based on assessing said sensor listing in said asset, wherein said identified asset behavior is defined as a specific target behavior of said asset, and wherein said each calculated-indicator is directly influenced by said at least two relevant processes;
(iii) program code for incorporating said calculated-indicator listing into said set of entity connections by associating elements of said calculated-indicator listing with entities of said set of entity connections, wherein all relevant objects and all relevant processes in said asset are properly listed and correspondingly associated into said asset representation of said asset, thereby producing the interconnected representation;
(iv) program code for associating said identified asset behavior with at least one said relevant object alone, or at least one said relevant process alone, or said at least one relevant object and said at least one relevant process taken together that is impairing said asset from optimally performing, conducting, or achieving said identified asset behavior; and
(v) program code for generating at least one hint associated with said at least one relevant object alone, or said at least one relevant process alone, or said at least one relevant object and said at least one relevant process taken together that is impairing said identified asset behavior, wherein said at least one hint specifies at least one said relevant object, at least one said relevant process, or at least one sensor-measurement combination in said asset representation of said asset.

12. The system of claim 11, wherein said at least one calculated-indicator is defined as a function of a sub-set of said sensor listing elements.

13. The system of claim 11, wherein said computer-readable code further includes:

(vi) program code for calculating a score for each said at least one hint using a predefined function, wherein said combination relates to said identified asset behavior; and
  (vii) program code for prioritizing said at least one hint based on said score.

14. The system of claim 11, wherein said creating includes using at least one period of identified asset behavior occurrence or non-occurrence to create said at least one calculated-indicator.

15. The system of claim 11, wherein said computer-readable code further includes:
  (vi) program code for, prior to said associating said identified asset behavior, comparing a first given interconnected representation having said identified asset behavior to a second given interconnected representation lacking said identified asset behavior to produce a comparison representation; and
  (vii) program code for relating said at least one hint to at least one listing element appearing in said comparison representation.

16. The system of claim 11, wherein said computer-readable code further includes:
  (vi) program code for training a machine-learning algorithm to predict status of said identified asset behavior, wherein said training further identifies related said listing elements.

17. The system of claim 11, wherein said incorporating includes using said asset representation to extend said assessing of said sensor listing as input to said at least one calculated-indicator.

18. The system of claim 11, wherein said computer-readable code further includes:
  (vi) program code for, prior to said associating said identified asset behavior, verifying said set of entity connections of said asset representation by analyzing said real-world data obtained by said relevant sensors; and
  (vii) program code for, subsequent to said verifying, cleaning said set of entity connections of said asset representation by retaining directly-influencing connections in said set, and by removing distal and/or indirectly-influencing connections from said set.

19. The system of claim 11, wherein said program code for generating further includes program code for:
  (A) gathering user feedback on said at least one hint;
  (B) learning a hint-scoring function from said user feedback;
  (C) calculating a score for each said at least one hint using said hint-scoring function; and
  (D) prioritizing said at least one hint based on said score.

20. The system of claim 11, wherein said generating includes modifying said at least one hint based on at least one templet of said asset representation.

21. A non-transitory computer-readable storage medium, having computer-readable code embodied on the non-transitory computer-readable storage medium, for identifying and improving asset behavior based on an interconnected representation of a complex physical operation, the computer-readable code comprising:
  (a) program code for providing an asset representation of an asset, wherein said asset is a complex physical system having a main activity; wherein an object is a physical item; wherein a process is a non-physical item that influences at least one object; wherein an entity is at least one physical object alone, at least one process alone, or at least one physical object and at least one process taken together of said asset; and wherein at least two said entities are adapted to act together to achieve said main activity; and wherein said asset representation includes:
  (i) a sensor listing having all relevant sensors available, all relevant measurements available, and all relevant sensor-data columns available in a database, related to real-world data measured or detected in said asset;
  (ii) an object listing having at least two relevant objects in said asset;
  (iii) a process listing having at least two relevant processes in said asset;
  (iv) a set of entity connections by associating listing elements in said sensor listing, said object listing, and said process listing; wherein all relevant objects and all relevant processes in said asset are properly listed and correspondingly associated into said asset representation of said asset;
(b) program code for creating a calculated-indicator listing having at least one calculated-indicator in said asset, wherein each said calculated-indicator is a measure configured to calculate, predict, or estimate an identified asset behavior based on assessing said sensor listing in said asset, wherein said identified asset behavior is defined as a specific target behavior of said asset, and wherein said each calculated-indicator is directly influenced by said at least two relevant processes;
(c) program code for incorporating said calculated-indicator listing into said set of entity connections by associating elements of said calculated-indicator listing with entities of said set of entity connections, wherein all relevant objects and all relevant processes in said asset are properly listed and correspondingly associated into said asset representation of said asset, thereby producing the interconnected representation;
(d) program code for associating said identified asset behavior with at least one said relevant object alone, at least one said relevant process alone, or said at least one relevant object and said at least one relevant process taken together that is impairing said asset from optimally performing, conducting, or achieving said identified asset behavior; and
(e) program code for generating at least one hint associated with said at least one relevant object alone, said at least one relevant process alone, or said at least one relevant object and said at least one relevant process taken together that is impairing said identified asset behavior, wherein said at least one hint specifies at least one said relevant object, at least one said relevant process, or at least one sensor-measurement combination in said asset representation of said asset.

22. The non-transitory computer-readable storage medium of claim 21, wherein said at least one calculated-indicator is defined as a function of a sub-set of said sensor listing elements.

23. The non-transitory computer-readable storage medium of claim 21, the computer-readable code further comprising:
  (f) program code for calculating a score for each said at least one hint using a predefined function, wherein said combination relates to said identified asset behavior; and
  (g) program code for prioritizing said at least one hint based on said score.

24. The non-transitory computer-readable storage medium of claim 21, wherein said creating includes using at least one period of identified asset behavior occurrence or non-occurrence to create said at least one calculated-indicator.

25. The non-transitory computer-readable storage medium of claim 21, the computer-readable code further comprising:
  (f) program code for, prior to said associating said identified asset behavior, comparing a first given interconnected representation having said identified asset behavior to a second given interconnected representation lacking said identified asset behavior non-occurrence to produce a comparison representation; and
  (g) program code for relating said at least one hint to at least one listing element appearing in said comparison representation.

26. The non-transitory computer-readable storage medium of claim 21, the computer-readable code further comprising:
  (f) program code for training a machine-learning algorithm to predict status of said identified asset behavior, wherein said training further identifies related said listing elements.

27. The non-transitory computer-readable storage medium of claim 21, wherein said incorporating includes using said asset representation to extend said assessing of said sensor listing as input to said at least one calculated-indicator.

28. The non-transitory computer-readable storage medium of claim 21, the computer-readable code further comprising:
  (f) program code for, prior to said associating said identified asset behavior, verifying said set of entity connections of said asset representation by analyzing said real-world data obtained by said relevant sensors; and
  (g) program code for, subsequent to said verifying, cleaning said set of entity connections of said asset representation by retaining directly-influencing connections in said set, and by removing distal and/or indirectly-influencing connections from said set.

29. The non-transitory computer-readable storage medium of claim 21, the computer-readable code further comprising:
  (f) program code for gathering user feedback on said at least one hint;
  (g) program code for learning a hint-scoring function from said user feedback;
  (h) program code for calculating a score for each said at least one hint using said hint-scoring function; and
  (i) program code for prioritizing said at least one hint based on said score.

30. The non-transitory computer-readable storage medium of claim 21, the computer-readable code further comprising:
  (f) program code for modifying said at least one hint based on at least one templet of said asset representation.

* * * * *